US008477737B2

(12) United States Patent
Rao

(10) Patent No.: US 8,477,737 B2
(45) Date of Patent: *Jul. 2, 2013

(54) SYSTEM AND METHOD TO IMPROVE UPLINK COVERAGE IN MULTI-CARRIER SYSTEMS

(75) Inventor: Anil M. Rao, Cedar Knolls, NJ (US)

(73) Assignee: Alcatel Lucent, Paris (FR)

( * ) Notice: Subject to any disclaimer, the term of this patent is extended or adjusted under 35 U.S.C. 154(b) by 1193 days.

This patent is subject to a terminal disclaimer.

(21) Appl. No.: 12/078,033

(22) Filed: Mar. 26, 2008

(65) Prior Publication Data

US 2009/0245207 A1 Oct. 1, 2009

(51) Int. Cl.
*H04W 4/00* (2009.01)
*H04W 36/00* (2009.01)

(52) U.S. Cl.
USPC .......................................... 370/333; 455/440

(58) Field of Classification Search
None
See application file for complete search history.

(56) References Cited

U.S. PATENT DOCUMENTS

| | | | |
|---|---|---|---|
| 2004/0106412 A1* | 6/2004 | Laroia et al. | 455/448 |
| 2006/0142032 A1* | 6/2006 | Derakhshan et al. | 455/509 |
| 2006/0166677 A1* | 7/2006 | Derakhshan et al. | 455/453 |
| 2007/0032237 A1* | 2/2007 | Chang et al. | 455/436 |
| 2007/0047498 A1* | 3/2007 | Zhang et al. | 370/335 |
| 2007/0072615 A1* | 3/2007 | Kim et al. | 455/436 |
| 2007/0232327 A1* | 10/2007 | Laroia et al. | 455/456.1 |
| 2009/0017838 A1* | 1/2009 | Laroia et al. | 455/456.1 |
| 2009/0137251 A1* | 5/2009 | Ji et al. | 455/437 |
| 2009/0163223 A1* | 6/2009 | Casey | 455/453 |
| 2010/0165857 A1* | 7/2010 | Meylan et al. | 370/252 |
| 2010/0248708 A1* | 9/2010 | Koivisto et al. | 455/419 |

FOREIGN PATENT DOCUMENTS

| | | |
|---|---|---|
| EP | 1 276 344 | 1/2003 |
| EP | 1 276 344 | 1/2006 |
| JP | 2005-020076 | 1/2005 |
| WO | WO 00/19762 | 4/2000 |

OTHER PUBLICATIONS

Notification of Transmittal of the International Preliminary Report on Patentability (IPER) dated Jul. 1, 2010.
International Search Report and Written Opinion dated Jul. 17, 2009.
Japanese Office Action dated Jan. 11, 2012 and English translation thereof.
Examiner's Office Letter, dated Jul. 31, 2012, for Japanese Application No. 2011-501794, and English translation thereof.
Notification of First Office Action dated Oct. 9, 2012, for Chinese Application No. 200980110824.1 and English translation thereof.

* cited by examiner

*Primary Examiner* — Eunsook Choi
(74) *Attorney, Agent, or Firm* — Harness, Dickey & Pierce, P.L.C.

(57) ABSTRACT

A method of uplink carrier handoff in a multiple carrier communication system may include receiving a measurement report from a mobile providing information regarding path loss as measured at the mobile for one of the multiple carriers on the downlink. A serving carrier may be the carrier over which the mobile communicates on the uplink. An instruction may be selectively sent to the mobile to handoff to a non-serving one of the multiple carriers depending on whether a threshold requirement has been met. The meeting of the threshold requirement may be based on the received measurement report and the serving carrier of the mobile. Each of the multiple carriers may have an associated threshold requirement.

19 Claims, 6 Drawing Sheets

SYSTEM AND METHOD TO IMPROVE UPLINK COVERAGE IN MULTI-CARRIER SYSTEMS

BACKGROUND

One of the major challenges operators face in deployment of 3G networks, such as UMTS, is the ability to provide broadband speeds to users throughout the entire cell. In typical network deployments, the users at the cell edge often get served with much smaller data rates compared to users closer to the base station. While proper link budget planning and cell site placement can ensure that users at the cell edge are able to achieve a minimum desired data rate (e.g., 64 kbps average throughput), the reality is that cell site locations from existing 2G deployments will be used, making such minimum desired data rates difficult to achieve.

Exacerbating the situation even further, the 2G network (e.g., GSM) may be operating in the 850 MHz band, whereas the 3G network is operating in both the 850 MHz band as well as the 1900 MHz band. The significantly increased path loss experienced at the higher carrier frequency limits the data rates that users can see at the cell edge even further; this is especially a problem in the uplink as the mobiles typically transmit at relatively lower power levels (e.g., 125 mW). As such, it may be more difficult to achieve both higher capacity and higher cell edge rates in 3G deployment.

Cell throughput may be traded off against improved user data rates at the edge of the cell. Unfortunately, the current mechanism for switching carriers (sometimes referred to as carrier handoff or inter-frequency handoff) is a lengthy process, taking up to 5 seconds to carry out. This type of delay is not acceptable in mobile wireless environments with potentially higher vehicle speeds and may prohibit the use of user location information to improve system performance.

SUMMARY

Conventional inter-frequency or carrier handoff requires that a mobile go through a process to identify suitable candidate carriers that, according to 3GPP specifications, can take as much as five seconds to perform. The identification process requires the mobile, with respect to each candidate carrier, to carry out one or more of the following functions: (1) perform a correlation operation on the primary synchronization channel (P-SCH), (2) perform a correlation operation on the secondary synchronization channel (S-SCH), and (3) receive the primary common pilot channel (P-CPICH). As such, methods which try to optimize system performance by moving users to different carriers in a given market cannot typically exploit user location information, given that the user location information may have significantly changed by the time the inter-frequency handoff is performed.

By contrast, at least one embodiment of the present invention does not require this identification process in performing inter-frequency or carrier handoff. As a result, in this embodiment, inter-frequency handoff may be performed an order of magnitude faster than conventional processes. For example, the carrier handoff may be accomplished in 400 ms. Therefore, example embodiments may employ user location information to improve system performance.

According to an example embodiment, a method of uplink carrier handoff in a multiple carrier communication system may include receiving a measurement report from a mobile providing information regarding path loss as measured at the mobile for one of the multiple carriers on the downlink. A serving carrier may be the carrier over which the mobile communicates on the uplink. An instruction may be selectively sent to the mobile to handoff to a non-serving one of the multiple carriers depending on whether a threshold requirement has been met. The meeting of the threshold requirement may be based on the received measurement report and the serving carrier of the mobile. Each of the multiple carriers may have an associated threshold requirement and allow a different load.

According to an example embodiment, a method of generating measurement reports for uplink carrier handoff in a multiple carrier communication system may include generating a measurement report providing information regarding path loss for one of the multiple carriers on the downlink depending on whether a measurement threshold requirement is met. The meeting of the measurement threshold requirement being based on the path loss information.

According to an example embodiment, a method of uplink carrier handoff in a multiple carrier communication system may include receiving a measurement report from a mobile providing information regarding a location of the mobile, a serving carrier being the carrier over which the mobile communicates on the uplink. An instruction may be selectively sent to the mobile to handoff to a non-serving one of the multiple carriers depending on whether a threshold requirement has been met, the meeting of the threshold requirement being based on the received measurement report and the serving carrier of the mobile, and each of the multiple carriers having an associated threshold requirement and allowing a different load.

According to an example embodiment, a method of uplink carrier handoff in a multi-carrier communication system may include generating a measurement report providing information regarding a location depending on whether a measurement threshold requirement is met. The meeting of the measurement threshold being based on the location information.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present invention, and wherein.

DETAILED DESCRIPTION OF EXAMPLE EMBODIMENTS

Figure 1:
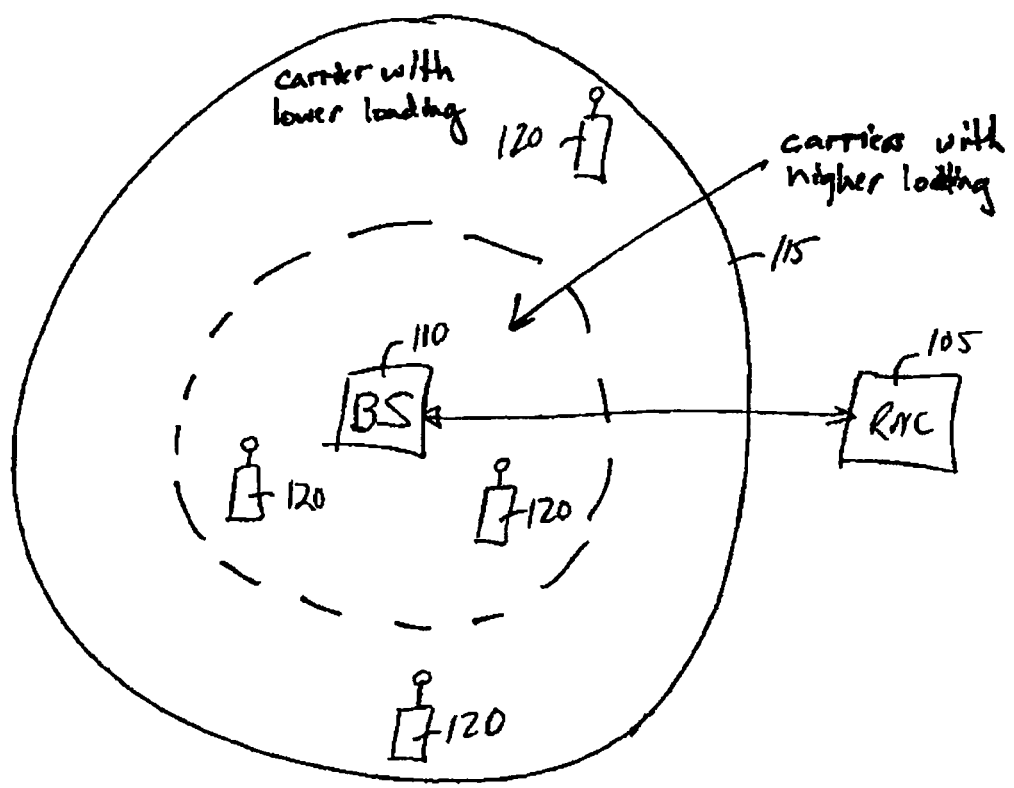
FIG. 1 illustrates a portion of a multiple carrier wireless telecommunications system according to an example embodiment.

Various example embodiments of the present invention will now be described more fully with reference to the accompanying drawings in which some example embodiments of the invention are shown. In the drawings, the thicknesses of layers and regions are exaggerated for clarity.

Detailed illustrative embodiments of the present invention are disclosed herein. However, specific structural and functional details disclosed herein are merely representative for purposes of describing example embodiments of the present invention. This invention may, however, may be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

As used herein, the term "mobile" may be considered synonymous to, and may hereafter be occasionally referred to, as a mobile unit, mobile station, mobile user, user equipment (UE), subscriber, user, remote station, access terminal, receiver, etc., and may describe a remote user of wireless resources in a wireless communication network. The term "base station" may be considered synonymous to and/or referred to as a base transceiver station (BTS), base station, NodeB, etc. and may describe equipment that provides data and/or voice connectivity between a network and one or more users.

As is well-known in the art, each of a mobile and a base station may have transmission and reception capabilities. Transmission from the base station to the mobile is referred to as downlink or forward link communication. Transmission from the mobile to the base station is referred to as uplink or reverse link communication.

FIG. 1 illustrates a portion of a multiple carrier wireless telecommunications system 100 according to an example embodiment. As shown, the wireless telecommunications system 100 includes a radio network controller (RNC) 105 communicatively coupled to one or more base stations 110. For the sake of clarity, only a single base station 110 is shown. The RNC 105 may be communicatively coupled to the one or more base stations 110 by any of a variety of wired and/or wireless links. Signals passed between the RNC 105 and the one or more base stations 110 may pass through one or more other devices (not shown), such as, routers, switches, networks or the like.

Each base station 110 is associated with at least one cell 115. Each cell 115 corresponds to a geographic area having a given radius. The base station 110 supports transmission and reception over multiple carriers. The carriers may be in a same band or different bands. A plurality of mobiles 120 may be located in the cell 115 at any one time. The mobiles 120 listen to more than one carrier of the base station 110 on the downlink, but only transmit on one carrier of the base station 110 on the uplink. However, the mobile stations 120 may also listen to carriers from other base stations on the downlink. The carrier over which a mobile 120 transmits on the uplink is referred to as the serving carrier for the mobile 120. Accordingly, the serving carrier provides signaling on the downlink to support the uplink traffic of the mobile 120; but otherwise, downlink communication to the mobile 120 may be over any one or more of the carriers. In particular, the mobiles 120 perform the processes to connect to multiple carriers and receive data on the downlink from any of the carriers.

As such, if handoff from a current serving carrier to a new serving carrier is required for a mobile 120, the mobile 120 does not need to perform a process of identifying candidate carriers to which the mobile may handoff. Namely, the mobile 120 has already established connections with carriers other the than the serving carrier, and may handoff to one of these non-serving carriers without incurring the delay associated with the identification of candidate carriers. For example, during call set up, the mobile 120 identifies the carriers and begins listening to the carriers prior to receiving measurement report requests (as discussed below) or handoff instructions (also discussed below). As such, the compressed mode measurements and lengthy cell identification process of the conventional art is not required, and inter-frequency handoff according to an example embodiment may be accomplished much faster (e.g., in 400 ms, which is an order of magnitude faster compared to the conventional inter-frequency handoff).

Figure 2:
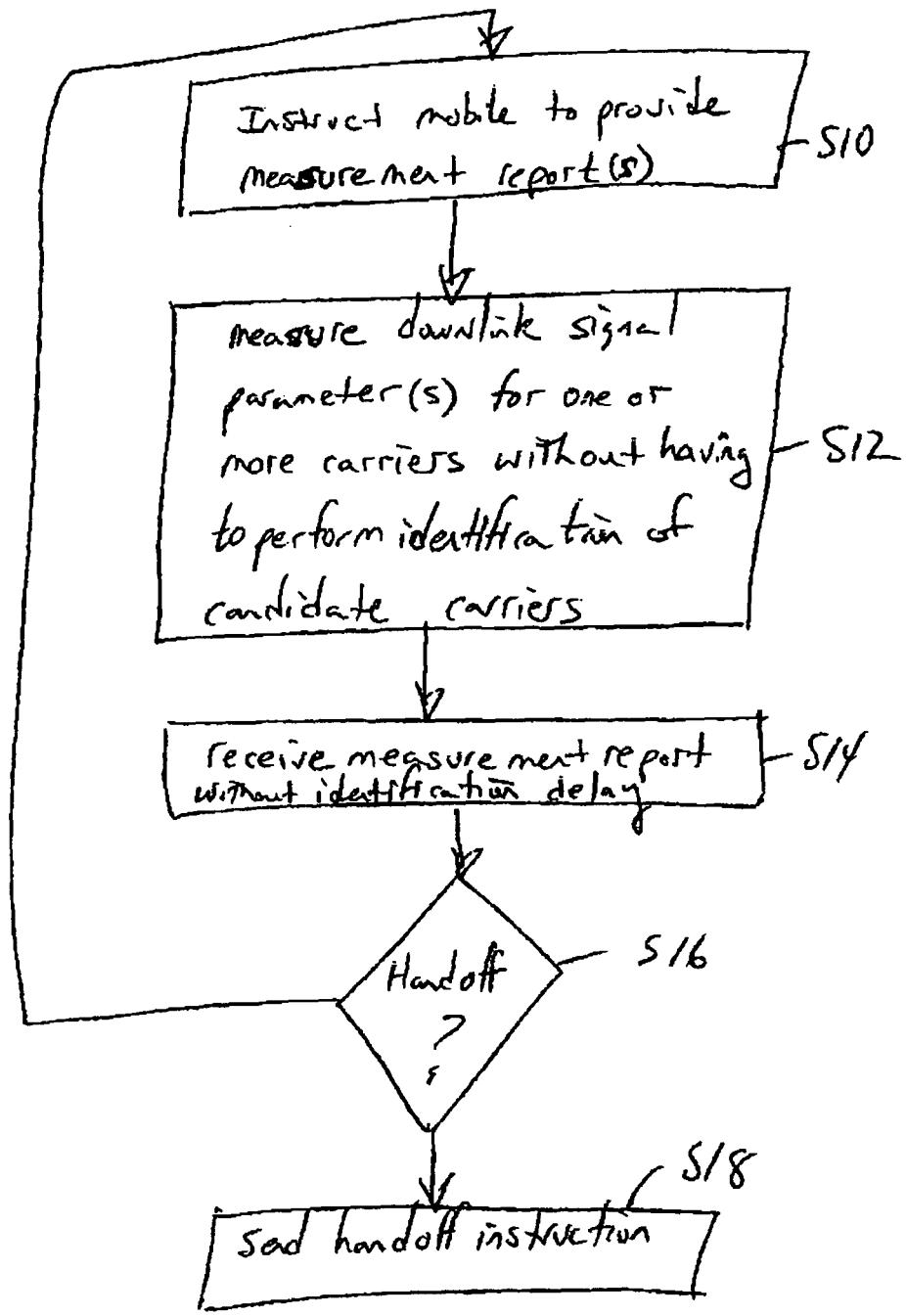
FIG. 2 illustrates a method of carrier handoff according to an example embodiment.

FIG. 2 illustrates this method of uplink carrier handoff according to an example embodiment. The method of FIG. 2 will be described in relation to the wireless telecommunications system 100, but it will be understood that this embodiment is not limited to the wireless telecommunications system 100 of FIG. 1. Furthermore, while FIG. 2 describes the method with respect to a single mobile, it will be appreciated that the method may be performed for more than one mobile. And, these performances may be in parallel.

As shown, in step S10, the RNC 105 instructs a mobile 120 to provide measurement report(s) for downlink measurements made on one or more of the carriers. In response, in step S12 the mobile 120 measures, for the downlink, one or more signal parameters associated with the one or more of the carriers to which the mobile 120 is connected, and the mobile 120 makes these measurements without having to perform a process of identifying candidate carriers. As a result, in step S14, the RNC 105 receives, via the base station 110, the measurement report(s) on the uplink without the delay associated with the mobile 120 having to perform identification of candidate carriers.

In step S16, the RNC 105 determines whether to instruct the mobile 120 to switch to a non-serving carrier as the serving carrier based on the measurement report(s). Numerous variations of measurement reports and the basis for deciding uplink handoff using those measurement reports may exist and be developed. Below, with respect to FIGS. 3A-3B, example embodiments of the measurement reports and basis for deciding uplink handoff are provided. However, it will be understood that the general uplink handoff methodology of the present invention is not limited to this example.

Returning to FIG. 2, if the RNC 105 determines not to handoff from the serving carrier, processing returns to step S10. However, if the RNC 105 determines to handoff from the serving carrier, the RNC 105 sends the handoff instruction to the mobile 120 via the base station 110 in step S18. In response, the mobile 120 will begin transmitting on the uplink over a new serving carrier. For example, the mobile 120 may perform physical channel reconfiguration and go through a synchronization procedure before transmitting on the new carrier.

Next, an example embodiment for serving/uplink carrier handoff in a multiple carrier communication system will be described. For ease of explanation, assume the base station 10 supports two carriers in this embodiment, wherein one carrier is configured as a higher loading carrier (e.g., to achieve higher cell throughput) than the other carrier which is configured as a lower loading carrier (e.g., to achieve higher cell edge bitrates). For example the higher loading carrier may be a 60% loading carrier to allow for higher capacity and the lower loading carrier may be a 30% loading carrier to allow for better cell edge data rates. Accordingly, the mobiles 120 listen to both the higher loading carrier and the lower loading carrier on the downlink, but the mobiles 120 may transmit on the uplink over only one of the higher and lower loading carriers. It will be appreciated from this disclosure that the present invention is not limited to the assumptions given above, and that these assumptions have been made only for the purposes of simplifying the explanation of example embodiments.

Example embodiments may use a path loss based triggering of inter-frequency handoff so that users are moved to the lower loading carrier frequency if the users are toward the edge of the cell, and the users are moved to the higher loading carrier frequency if the users are in an interior portion of the cell. The loading level on a particular carrier may be managed by a scheduler function in the base station 110 and/or the RNC 105. Accordingly, mobiles nearer to the cell border may operate on the carrier with lighter loading, which may improve the data rates achievable by these more power limited mobiles, and the mobiles more toward the interior of the cell may operate on the carrier with higher loading so that a higher overall cell throughput may be achieved.

Figure 3A:
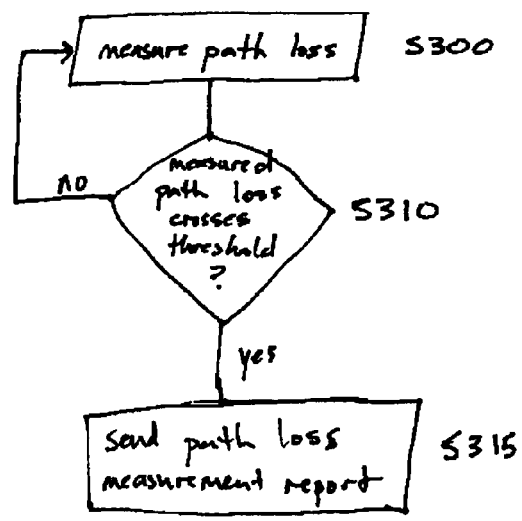
FIGS. 3A and 3B illustrate a method of carrier handoff based on path loss according to an example embodiment.
Figure 3B:
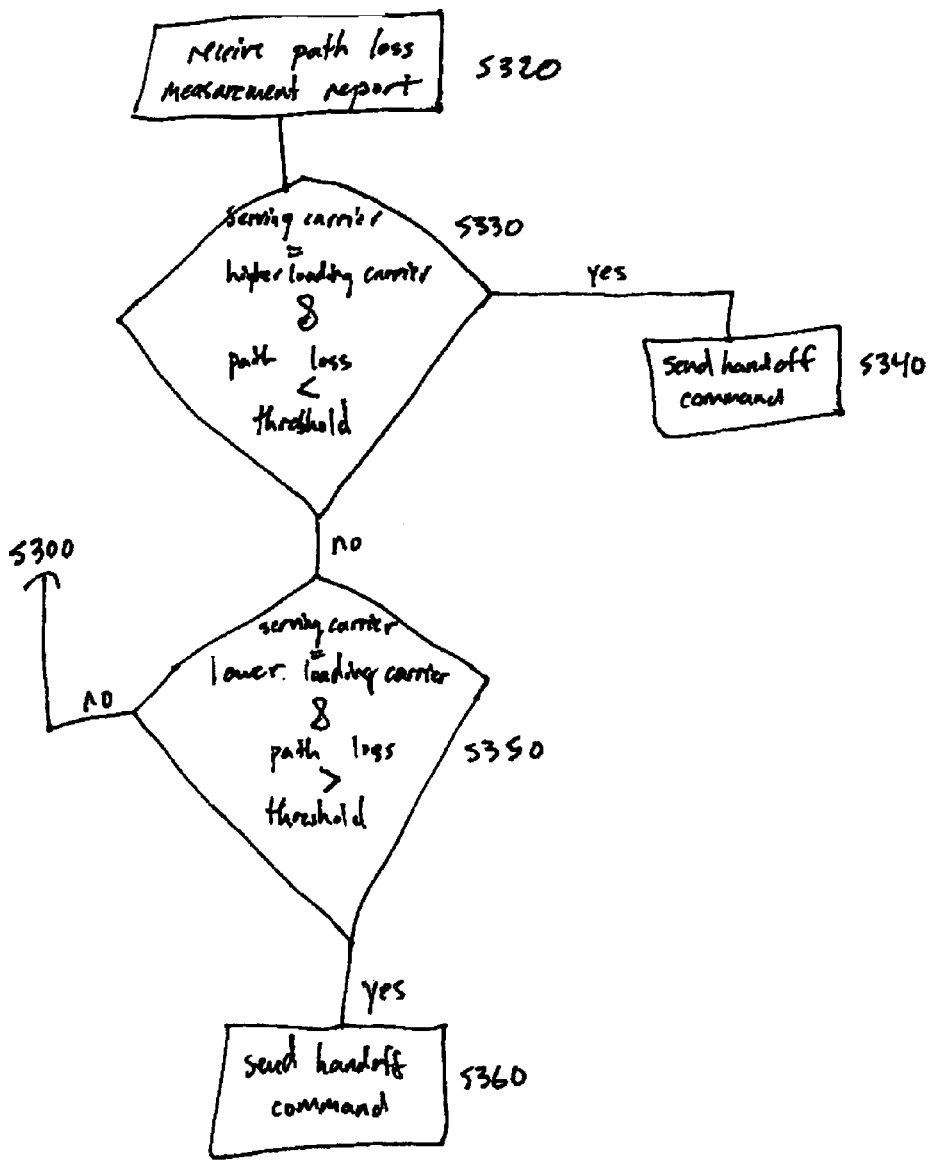

FIGS. 3A and 3B illustrate a method of inter-frequency handoff performed by the RNC 105 for a mobile 120 based on path loss. Referring to FIG. 3A, in step S300, the mobile 120 measures, e.g., in response to an instruction from the RNC 105, the downlink path loss on at least one of the multiple carriers on the downlink to which the mobile 120 is listening. For example, in the present example, the mobile 120 measures the downlink path loss on at least one of the higher loading carrier and the lower loading carrier. Path loss measurements are a well known part of the 3GPP specification, in the form of Received Signal Code Power (RSCP) measurements, from which path loss may be deduced. At step S310, the mobile 120 determines if the measured path loss has moved above or dropped below a path loss threshold, e.g., as compared to a previously measured path loss. If the measured path loss of the mobile 120, e.g., the measured RSCP, on a current carrier either has moved above or dropped below the path loss threshold from the previously measured path loss, the mobile 120 sends a report informing the serving base station 110 that the path loss of the mobile 120 has crossed the path loss threshold in step S315. For example, the EVENT 1E/1F reporting in the current 3GPP specification supports sending a RSCP from the mobile 120. If the measured path loss of the mobile 120 on the current carrier has not moved above or dropped below the path loss threshold, processing returns to step S300.

Referring to FIG. 3B, in step S320, the RNC 105 receives a report informing the serving base station 110 that the path loss of the mobile 120 has crossed the path loss threshold. In step S330, the RNC 105 determines if (1) the current uplink carrier of mobile 120 is the carrier with the higher loading level and (2) a report was received indicating the measured path loss has fallen below the path loss threshold. If so, the RNC 105 sends an inter-frequency handoff command, (e.g., as described with respect to FIG. 2), to the mobile 120 to change a serving carrier of the mobile from x to y, e.g., to move the mobile 120 from the carrier frequency with the higher loading to the carrier frequency with lower loading, in step S340.

If, in step S330, the current uplink carrier of the mobile is not the carrier with the higher loading level or if the measured path loss has not fallen below the path loss threshold, the RNC 105 determines if the current uplink carrier of the mobile 120 is (1) the carrier with the lower loading level and (2) a report was received indicating the measured path loss has exceeded the path loss threshold in step S350. If so, the RNC 105 sends an inter-frequency handoff command, (e.g., as described with respect to FIG. 2), to the mobile 120 to change a serving carrier of the mobile from x to y, e.g., to move the mobile from the carrier frequency with the lower loading level to the carrier frequency with the higher loading level, in step S360. If, in step S350, the current uplink carrier of the mobile is not the carrier with the lower loading level or if the measured path loss has not exceeded the path loss threshold, processing returns to step S300.

Example embodiments with respect to FIGS. 3B are described with step S330 before step S350. However, example embodiments are not limited thereto and step S330 may be performed before or at the same time as step S350.

Figure 4A:
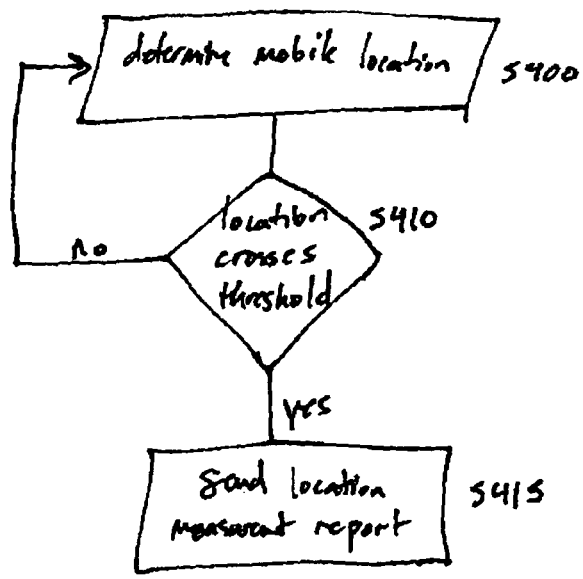
FIGS. 4A and 4B illustrate a method of carrier handoff based on a location of a mobile according to an example embodiment.
Figure 4B:
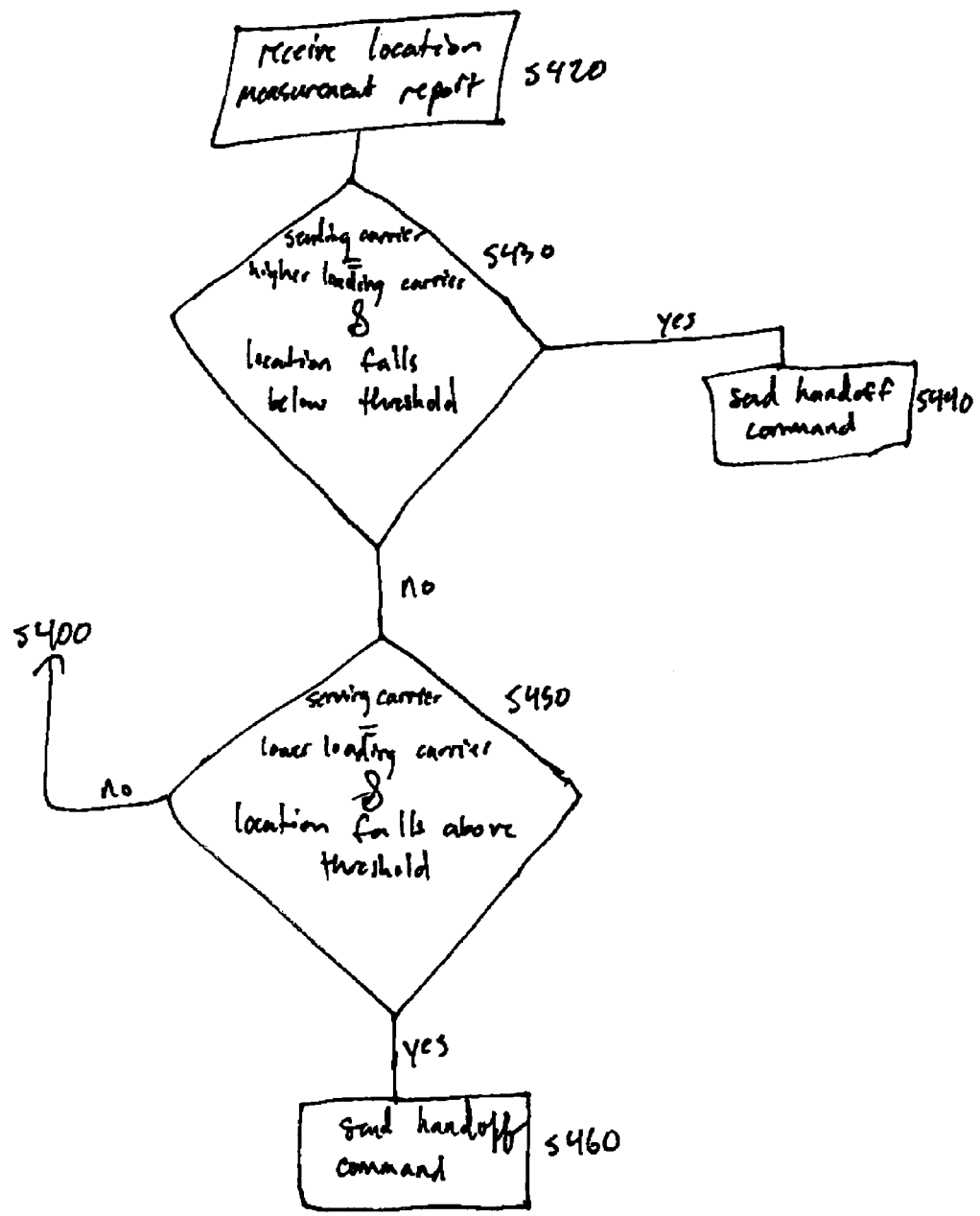

Example embodiments are described above with respect to FIGS. 3A and 3B as performing a handoff based on path loss; however, example embodiments are not limited thereto. Instead, the handoff process may be location based, and a location of the mobile 120 may be determined based on mobile measurements other than path loss, triangulation, GPS, etc. FIGS. 4A and 4B illustrates a method of inter-frequency handoff performed by the RNC 105 for a mobile 120 based on a location of the mobile 120.

Referring to FIG. 4A, in step S400 a location of the mobile 120 may be determined, e.g, in response to an instruction from the RNC 105, by any known method (e.g., mobile measurements, triangulation, GPS, etc). At step S410, the mobile 120 determines if the determined location has moved above or dropped below a location threshold, e.g., as compared to a previously determined location. If the location of the mobile 120 has moved above or dropped below the location threshold from the previously measured location, the mobile 120 sends a report informing the serving base station 110 that the location of the mobile 120 has crossed the threshold in step S415. If the determined location of the mobile 120 on the current carrier has not moved above or dropped below the threshold, processing returns to step S400.

Referring to FIG. 4B, in step S420, the RNC 105 receives a report informing the serving base station 110 that the location of the mobile 120 has crossed the threshold in step S420. In step S430, the RNC 105 determines if (1) the current uplink carrier of mobile 120 is the carrier with the higher loading level and (2) a report was received indicating the location has fallen below the location threshold. If so, the RNC 105 sends an inter-frequency handoff command, (e.g., as described with respect to FIG. 2), to the mobile 120 to change a serving carrier of the mobile 120 from x to y, e.g., to move the mobile 120 from the carrier frequency with the higher loading to the carrier frequency with lower loading, in step S440.

If, in step S430, the current uplink carrier of the mobile is not the carrier with the higher loading level or if the determined location has not fallen below the threshold, the RNC 105 determines if the current uplink carrier of the mobile 120 is (1) the carrier with the lower loading level and (2) a report was received indicating the location has exceeded the threshold in step S450. If so, the RNC 105 sends an inter-frequency handoff command, (e.g., as described with respect to FIG. 2), to the mobile 120 to change a serving carrier of the mobile 120 from x to y, e.g., to move the mobile from the carrier frequency with the lower loading level to the carrier frequency with the higher loading level, in step S460. If, in step S350, the current uplink carrier of the mobile is not the carrier with the lower loading level or if the location has not exceeded the location threshold, processing returns to step S400.

Although the threshold is described above as configured to create a coverage zone for the carrier with higher loading and a coverage zone for the carrier with lower loading (e.g., as illustrated in FIG. 1), example embodiments are not limited thereto. For example, the threshold may be configured to create any number of intermediary coverage zones between the higher loading zone and lower loading zone. Accordingly, example embodiments may include any number of coverage zones. For example, the threshold may be configured as having two threshold levels thereby creating a higher loading carrier, a lower loading carrier, and an intermediary loading carrier with associated threshold requirements.

While the embodiments have been described with respect to inter-carrier handoff for carriers from a single base station, it will be understood that the handoff methodologies may be expanded to include carriers from multiple base stations.

Furthermore, while the handoff methodology is described as being performed at the RNC, it will be understood that the methodology could be performed at other network elements such as the base station, etc.

Example embodiments being thus described, it will be obvious that the same may be varied in many ways. Such variations are not to be regarded as a departure from the invention, and all such modifications are intended to be included within the scope of the invention.

I claim:

1. A method of uplink carrier handoff in a multiple carrier communication system, comprising:
   receiving a measurement report from a mobile providing information regarding path loss as measured at the mobile for one of the multiple carriers on the downlink, a serving carrier being the carrier over which the mobile communicates on the uplink; and
   selectively sending an instruction to the mobile to handoff to a non-serving one of the multiple carriers depending on whether a threshold requirement has been met, the threshold requirement configured to create a first coverage zone for a carrier of a first loading capacity and a second coverage zone for a carrier of a second loading capacity, the meeting of the threshold requirement being based on the received measurement report and a loading capacity of the serving carrier of the mobile, and each of the multiple carriers having an associated threshold requirement and are configured to allow a different load, the loading capacity of the serving carrier having been selected from a plurality of loading capacities.

2. The method of claim 1, wherein each of the multiple carriers is associated with a different threshold requirement.

3. The method of claim 1, wherein the received measurement report provides information on received power of the one of the multiple carriers measured on the downlink as the path loss information.

4. The method of claim 3, wherein the received measurement report indicates whether the received power crossed a threshold from a previously measured received power.

5. The method of claim 1, wherein the multiple carriers include a higher loading carrier and a lower loading carrier, the higher loading carrier allowing a higher load than the lower loading carrier.

6. The method of claim 5, wherein
   the receiving receives a measurement report indicating whether a received power of the one of the multiple carriers measured on the downlink is less than a first power threshold; and
   the sending sends the handoff instruction if the measurement report indicates the received power of the one of the multiple carriers measured on the downlink is less than the first power threshold and the serving carrier is the higher loading carrier.

7. The method of claim 6, wherein
   the receiving receives a measurement report indicating whether the received power of the one of the multiple carriers measured on the downlink is greater than a second power threshold; and
   the sending sends the handoff instruction if the measurement report indicates the received power of the one of the multiple carriers measured on the downlink is greater than the second power threshold power threshold and the serving carrier is the lower loading carrier.

8. The method of claim 7, wherein the first power threshold is the same as the second power threshold.

9. The method of claim 7, wherein
   the first power threshold is lower than the second power threshold, and
   the multiple carriers include the higher loading carrier, the lower loading carrier, and at least one intermediate loading carrier allowing a load between the loads allowed by the higher loading carrier and the lower loading carrier.

10. The method of claim 9, wherein
    the receiving receives a measurement report indicating whether the received power of the one of the multiple carriers measured on the downlink is greater than the second power threshold; and
    the sending sends the handoff instruction if the measurement report indicates the received power of the one of the multiple carriers measured on the downlink is greater than the second power threshold and the serving carrier is the intermediate serving carrier.

11. The method of claim 10, wherein
    the receiving receives a measurement report indicating whether the received power of the one of the multiple carriers measured on the downlink is less than the first power threshold; and the sending sends the handoff instruction if the measurement report indicates the received power of the one of the multiple carriers measured on the downlink is less than the first power threshold and the serving carrier is the intermediate serving carrier.

12. The method of claim 11, wherein the receiving receives a measurement report indicating whether the received power of the one of the multiple carriers measured on the downlink is less than the second power threshold; and the sending sends the handoff instruction if the measurement report indicates the received power of the one of the multiple carriers measured on the downlink is less than the second power threshold and the serving carrier is the higher loading carrier.

13. The method of claim 12, wherein the receiving receives a measurement report indicating whether the received power of the one of the multiple carriers measured on the downlink is greater than the first power threshold; and the sending sends the handoff instruction if the measurement report indicates the received power of the one of the multiple carriers measured on the downlink is greater than the first power threshold and the serving carrier is the lower loading carrier.

14. The method of claim 5, wherein the receiving receives a measurement report indicating whether the path loss of the one of the multiple carriers measured on the downlink is greater than a path loss threshold; and the sending sends the handoff instruction if the measurement report indicates the path loss of the one of the multiple carriers measured on the downlink is greater than the path loss threshold and the serving carrier is the lower loading carrier.

15. The method of claim 5, wherein the receiving receives a measurement report indicating whether the path loss of the one of the multiple carriers measured on the downlink is less than a path loss threshold; and the sending sends the handoff instruction if the measurement report indicates the path loss of the one of the multiple carriers measured on the downlink is less than the path loss threshold and the serving carrier is the higher loading carrier.

16. The method of claim 1, wherein the receiving receives the measurement report without a candidate carrier identification delay.

17. The method of claim 1, wherein the mobile is connected to a plurality of the multiple carriers on the downlink and only one of the multiple carriers on the uplink.

18. The method of claim 1, wherein the loading capacity is configured to selectively achieve high cell throughput or high cell edge bitrates.

19. A method of uplink carrier handoff in a multiple carrier communication system, comprising:

receiving a measurement report from a mobile providing information regarding a location of the mobile, a serving carrier being the carrier over which the mobile communicates on the uplink; and selectively sending an instruction to the mobile to handoff to a non-serving one of the multiple carriers depending on whether a threshold requirement has been met, the threshold requirement configured to create a first coverage zone for a carrier of a first loading capacity and a second coverage zone for a carrier of a second loading capacity, the meeting of the threshold requirement being based on the received measurement report and a loading capacity of the serving carrier of the mobile, and each of the multiple carriers having an associated threshold requirement and are configured to allow a different load, the loading capacity of the serving carrier having been selected from a plurality of loading capacities.

* * * * *